United States Patent [19]
Stewing

[11] 3,920,268
[45] Nov. 18, 1975

[54] SYNTHETIC-RESIN TUBE ASSEMBLY

[76] Inventor: Albert Stewing, Barbarastr 56, 427 Dorsten, Germany

[22] Filed: Sept. 7, 1973

[21] Appl. No.: 395,377

Related U.S. Application Data

[62] Division of Ser. No. 332,227, Feb. 13, 1973, Pat. No. 3,847,694.

[52] U.S. Cl. .................. 285/21; 138/155; 285/297; 285/381; 285/423
[51] Int. Cl.² ..................... F16L 47/02; B29C 27/00
[58] Field of Search ........... 138/155, 146, 143, 141, 138/125, 153, 142, 147, 141, DIG.1, DIG. 7; 285/381, 294, 21, DIG. 16, 423, 297; 260/841, 857

[56] References Cited
UNITED STATES PATENTS

| | | | |
|---|---|---|---|
| 2,713,383 | 7/1955 | Kennedy | 138/DIG. 7 X |
| 2,992,457 | 7/1961 | Harrison | 138/142 X |
| 3,012,585 | 12/1961 | O'Brien, Jr. | 138/141 |
| 3,276,929 | 10/1966 | Ferch | 285/381 X |
| 3,315,986 | 4/1967 | Quick | 285/381 X |
| 3,484,121 | 12/1969 | Quinton | 285/381 X |
| 3,498,866 | 3/1970 | Kilbane | 138/142 X |
| 3,513,429 | 5/1970 | Heslop | 285/381 |
| 3,539,411 | 11/1970 | Heslop et al. | 138/141 X |
| 3,755,032 | 8/1973 | Higbee | 138/125 X |
| 3,808,289 | 4/1974 | Okuhashi | 260/841 X |

Primary Examiner—Richard C. Queisser
Assistant Examiner—Daniel M. Yasich
Attorney, Agent, or Firm—Karl F. Ross; Herbert Dubno

[57] ABSTRACT

The spigot end of a tube made of hard polyvinylchloride (PVC) is fitted into the heat-shrinkable bell end of a similar tube. A hot thermally-activatable adhesive is injected into the space between the bell and spigot so that it heats and shrinks the bell, causing it to compress and distribute the adhesive mass throughout the joint. The bell is formed with a circumferential bulge forming an inwardly openeing circumferential recess into which the adhesive mass is injected through at least one radially opening hole. The mass of adhesive in this groove serves as a hot reservoir of glue during shrinking and distribution.

1 Claim, 6 Drawing Figures

SYNTHETIC-RESIN TUBE ASSEMBLY

This is a division of application Ser. No. 332,227, filed 13 Feb. 1973, now U.S. Pat. No. 3,847,694.

FIELD OF THE INVENTION

The present invention relates to the joining together of two tubes. More particularly this invention relates to a system of forming a joint between two synthetic-resin tubes.

BACKGROUND OF THE INVENTION

Synthetic-resin tubing or pipes such as the hard polyvinylchloride (PVC) ducts and telephone-wire conduit cannot be threaded effectively so that joining together two such tubes presents a considerable problem. The joint must be completely fluidtight so that the cables are not flooded and therefore ruined, and at the same time the joint must be physically strong so that for example cables buried under streets are not opened up by vibration caused by traffic. Furthermore underground conduit through which electrical-service conductors pass must be capable of withstanding attack by subsurface chemicals and to settling of the ground. A standard practice is to use a solvent-type adhesive between the ends of the tubes. In the case of bell-and-spigot joints the adhesive is applied to the spigot and when a coupling is used, both ends are coated. Such adhesive bonding has two principal disadvantages. First the joint must be left undisturbed after application for a period sufficient to enable the joint to harden, usually for several hours, so that work is held up. Furthermore it is difficult to obtain a good bond with solvent glues since the pipe is generally being installed underground where it becomes moist and contaminated, and in any case hard PVC, which is the material usually used for such pipes, and like thermoplastics does not take adhesives well so that a firm bond is difficult to form.

A quicker method of joining pipes entails the use of a bell or a coupling which is slipped over the spigot with interposition of an elastomeric seal; this bell or coupling is then heated and shrunk around the spigot, flattening out the seal. Such a method is indeed rapid, but the seal is occasionally imperfect so that the joint must be puttied or otherwise coated. In addition the equipment necessary to heat the joint is bulky and clumsy to use, especially in situ.

With both of these methods the strength of the joint is inadequate. Pipes or conduits so joined are not capable of withstanding strong longitudinal or transverse stresses, and separation of the joint is not unusual. The same also applies when the two pipes are telescopingly interfitted frictionally.

OBJECTS OF THE INVENTION

It is therefore an object of the present invention to provide an improved method of joining tubes and making an improved tube assembly.

Another object is the provision of a method of forming a joint between a pair of synthetic-resin tubes.

Yet another object is to provide an improved pipe joint which is stronger than the above-described types.

SUMMARY OF THE INVENTION

I achieve these objects with a pipe joint between thermoplastic members formed by injecting a hot thermally softened adhesive into the space between a pipe and a surrounding bell or coupling, this bell or coupling being heat shrinkable. The heat of the mass of adhesive serves to shrink thermally the outer tube so that it compresses the mass of adhesive distributing it throughout the joint and retaining the set or hardened adhesive under compression. Thus the finished joint has all the advantages of an effective adhesive joint, and all of the advantages of a thermally shrunk joint. The hot adhesive forms an excellent bond with, for instance, hard-PVC tubing which normally does not bond well with adhesive and with tubing of other thermoplastic material.

Obviously such a method allows a joint to be formed with ease since no complicated heating collars or the like need be employed to heat the outer tube. A simple heated adhesive gun is applied to a radially opening orifice to inject a measured charge of hot adhesive into the joint. As soon as the adhesive cools below its critical temperature, usually around 65° C, it hardens so that the joint is set and further work in the pipeline can be carried out without fear of damaging the fresh joints. A pipeline or string so formed is found to be stronger at the joints than between them, results unobtainable in prior-art systems.

The invention thus comprises the step of injecting a hot adhesive into an annular space between a pair of telescopingly interconnected rigid tube members of thermoplastic material, the outer or female member of which is thermally shrinkable. The adhesive mass is preferably calculated to fill the space and, with respect to the heat capacity of the adhesive, sufficient to enable at least a 10% shrinkage of the circumference of the outer member, the mass having a temperature at least equal to that at which the outer member is shrinkable. The adhesive is preferably a polyamide composition consisting of 70 to 95 parts by weight polyamide and 5 to 30 parts by weight aromatic compounds having free hydroxyl groups attached to the aromatic nucleus. Suitable compounds of the latter type are benzene mono, di and triols while the polyamide may be an epsiloncaprolactam polymer. The adhesive may contain up to 50% filler (e.g., silica) in a particle size ranging from several microns to several hundred microns. Preferably, the space is an annular groove in one of the members, advantageously the outer member, open toward the other member. Where the groove or recess has a cross section corresponding to an arc segment, the surface area of the hot adhesive mass in contact with the outer shrinkable tube is proportionately large and provides an effective area for heat exchange wth the tube.

According to another feature of the invention, the pipes are of uniform thickness, i.e., the groove or recess is produced by deforming the wall of the outer member to provide the aforementioned bulge therein. The inner pipe member is provided with a smooth (nondeformed) cylindrical surface juxtaposed with the groove and may fit with a slight clearance into the outer member. When the term "spigot" is used hereinafter, therefore, it is intended to refer to the latter structure at the end of a pipe while the term "bell" is intended to refer to the female member whether or not it has an enlarged diameter sleeve portion accommodating the spigot.

DESCRIPTION OF THE DRAWING

The above and other objects, features, and advantages will become apparent from the following description, reference being made to the accompanying drawing in which.

SPECIFIC DESCRIPTION

Figure 1:
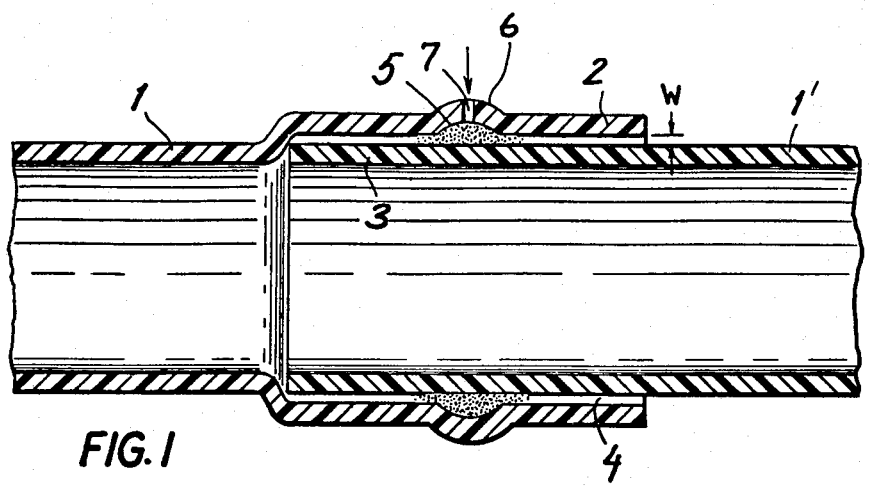
FIG. 1 is a longitudinal section through a pipe joint according to the present invention just as the hot adhesive is injected.
Figure 3:
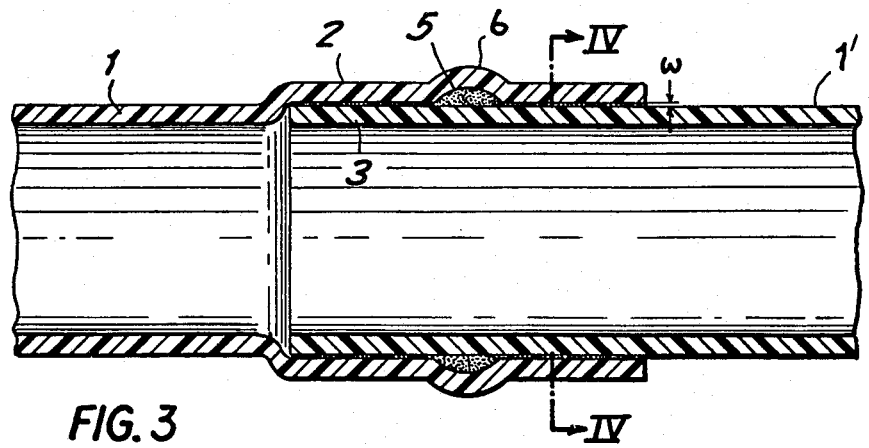
FIG. 3 is a view similar to FIG. 1, showing the joint after the outer tube has shrunk and the adhesive is distributed.
Figure 4:
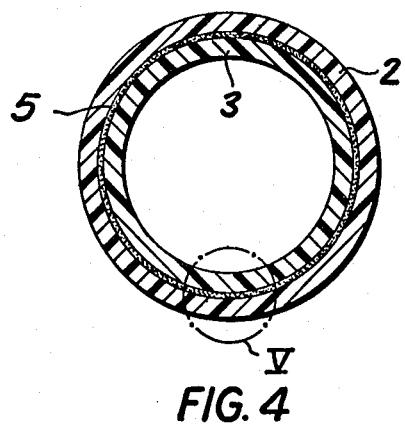
FIG. 4 is a section taken along line IV — IV of FIG. 3.
Figure 2:
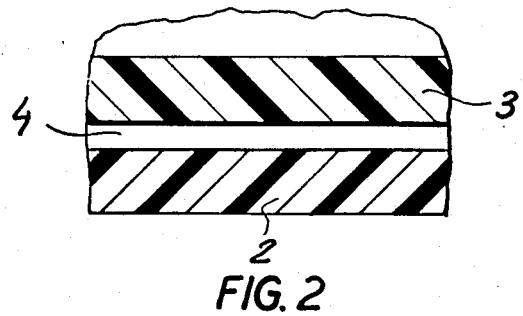
FIG. 2 is a detail of FIG. 1, in enlarged scale.
Figure 5:
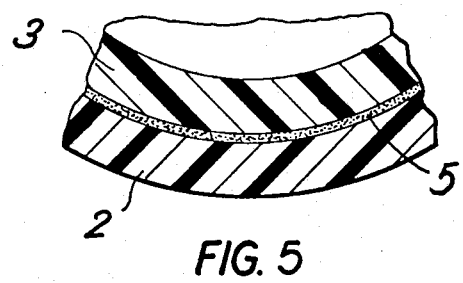
FIG. 5 is the detail shown by arrow V in FIG. 4.

As shown in FIGS. 1 and 2, a pair of conduits 1, 1' are longitudinally coupled together at their ends by inserting the smooth spigot 3 of one tube into the bell 2 of the other. These tubes are made of hard polyvinylchloride by extrusion. The bell 2 is made in a manner known in the art to be shrinkable, e.g., by prestressing it during manufacture so that on heating its internal diameter will decrease (plastic memory).

The bell 2 is formed around its middle with an inwardly open channel on groove 6 formed by a welt or bulge around this bell. A hole 7 piercing the bell 2 at the welt 6 allows a mass 5 of heat-activatable adhesive to be injected into the gap 4 between the bell 2 and spigot 3. The mass 5 is heated prior to injection to liquefy it, this heat is then transmitted to the bell and spigot. The bell 2 then shrinks inwardly, thereby reducing the width of the gap 4 from width W to smaller width w and simultaneously forces the mass 5 axially along the joint. The hot resin mass 5 forms a particularly good bond with the synthetic-resin tubes 1.

Once the mass 5 cools it forms an extremely strong bond with the two pipe ends 2 and 3; this bond is all the stronger because the shrinkage of the bell 2 around the spigot 3 itself makes a strong connection. As the mass 5 is forced axially along the joint it cools, so that by the time it reaches the extreme end of the spigot 3 it is so viscous that it cannot flow around this end and into the interior of the pipes.

Figure 6:
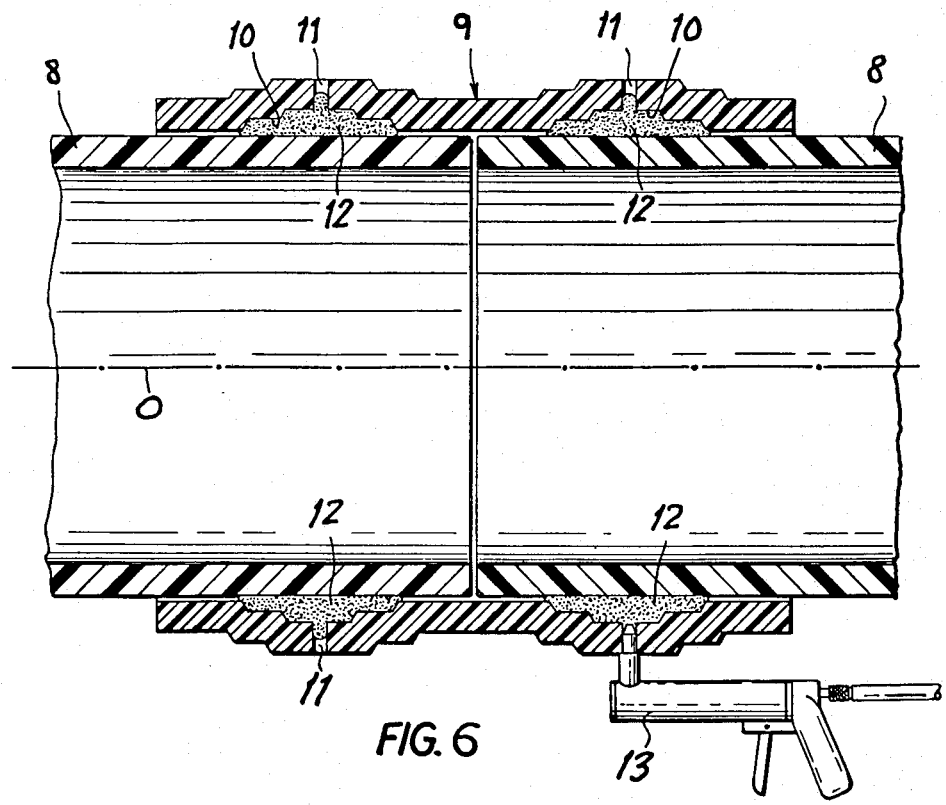
FIG. 6 is a view similar to FIG. 1 illustrating an alternative form of a joint of the present invention.

FIG. 6 shows an arrangement wherein two conduit ends 8 are inserted into a sleeve 9 and butted together axially. The sleeve 9 is formed with two internal grooves 10 which can be filled with a fusion adhesive 12 through radially opening holes 11. An injecting pistol 13 is shown engaged against one of the several openings 11 leading into the right-hand groove 10. In this embodiment the sleeve 9 is made of a resin which has a greater shrink factor than the pipes 8, e.g., the sleeve is hard PVC with plastic memory as noted above, compared to hard-PVC pipes with no plastic memory. The gun 13 is held against the several holes of each groove until the required quantity of resin is injected in, and the shrinkage and sealing (with cooling) take place automatically as discussed above. The grooves 10 form reservoirs of hot glue that are pumped along the joint by the shrinking action so that sufficient heat is available to shrink the coupling 9.

EXAMPLE

A connection is formed between two pipes 1 as shown in FIG. 1 wherein the pipes are made of hard polyvinylchloride with an inside diameter of 30 centimeters. Then wall thickness of the conduits 1 is 6 millimeters and the inside diameter of the bell 2 is 316 millimeters, giving a play of 2 millimeters between the bell 2 and spigot 3. The bell 2 is prestressed by stretching just after formation, while it is still hot, and cooling in the stretched position so that on cooling the bell shrinks. In this case 10% shrinkage is possible in the bell 2.

A quantity of 75 cubic centimeters of synthetic-resin mass 5 having the following composition is mixed with a sufficient quantity of fine quartz sand to give an overall volume of 110 cubic centimeters, is heated to 175° C and is injected between the bell and spigot:

80% by weight epsilon carprolactampolyamide
20% by weight aromatic binder with active hydroxyl groups.

The bell 2 has an outside circumference of 1030 millimeters which, as mentioned above, is capable of shrinking by 10%, hence to 927 millimeters. The shrinkage could reduce its inner diameter to 279 millimeters, which is smaller than the outside diameter of the inner tube. Thus it should be clear that a very tight fit will be formed between the two. Without any shrinkage approximately 900 cubic centimeters of resin and filler would be necessary to fill the space between the bell and spigot, but allowing for the shrinkage of the outer bell and the inevitable slight shrinkage of the inner tube, the 100 cubic centimeter quantity used completely fills the space between the two.

After injection of the hot resin mass into the joint, which was done in situ, the joint was cooled and hard in no more than 11 minutes, at which time the pipes could be handled with no fear of damaging the freshly formed joint.

Tubes connected together in this manner were bent until they broke. This break did not occur at the joint but next to it. similarly tubes so connected were pulled evenly in opposite directions, and once again when they finally fractured they did so not at the joint but along the straight part of the tube. In addition a pressure test to rupture the tubing showed that the pipes split between the joints rather than at them thereby indicating that the joint was stronger than the tubes. Thus the joint so formed is stronger than the tubing.

Of course, the pipe coupling formed in this manner need not be employed exclusively for electrical conduct as mentioned above but can be used for conveying substantially any fluid (liquid or gas) and is especially effective for pipelines for gas, water or oil.

I claim:

1. A duct for electrical conductors or the like comprising:
    a succession of interfitted extruded lengths of thermoplastic synthetic-resin tubes each having a unitarily formed heat-shrinkable bell portion at one end defining an internally open crescent-shaped peripheral recess and a smooth-surface opposite end received in the bell portion of an adjoining tube;
    a hardened mass of heat-activatable melt adhesive filling said recess and of a heat capacity sufficient to transfer, in a heat activated liquid state of the adhesive, sufficient heat to said bell portion to shrink the latter onto said adhesive and the end of an adjoining tube received therein, said bell portion being formed with a hole communicating with said recess for the filling thereof with said adhesive, said adhesive being bonded to the respective bell portion and end of the tubes, and said bell portion being in a heat-shrunk state fitting tightly around the tube end and adhesive received therein.

* * * * *